United States Patent
Mancl et al.

(10) Patent No.: US 8,387,898 B1
(45) Date of Patent: Mar. 5, 2013

(54) PAINT SPRAYER WITH BEARING PROTECTION

(76) Inventors: Scott C. Mancl, Elizabethton, TN (US); Dennis J. Mancl, Bluff City, TN (US)

(*) Notice: Subject to any disclaimer, the term of this patent is extended or adjusted under 35 U.S.C. 154(b) by 345 days.

(21) Appl. No.: 12/800,328

(22) Filed: May 13, 2010

Related U.S. Application Data

(63) Continuation-in-part of application No. 12/462,093, filed on Jul. 29, 2009.

(60) Provisional application No. 61/207,774, filed on Feb. 17, 2009.

(51) Int. Cl.
*A62C 13/62* (2006.01)
*A62C 5/02* (2006.01)
*F16C 33/76* (2006.01)
*B05B 7/32* (2006.01)
*B05B 7/12* (2006.01)
*B05B 7/02* (2006.01)

(52) U.S. Cl. ........ 239/340; 384/486; 239/310; 239/337; 239/526; 239/407

(58) Field of Classification Search .................. 239/340, 239/310, 337, 526, 407, 398; 277/380, 381, 277/384, 394, 397; 384/151, 152, 477, 478, 384/480, 484, 486; 310/85, 90, 91; 96/128; 415/199.1, 199.2, 229, 230, 231, 110; 416/198 R
See application file for complete search history.

(56) References Cited

U.S. PATENT DOCUMENTS

| | | | | |
|---|---|---|---|---|
| 2,263,842 A | * | 11/1941 | Gross | 220/324 |
| 3,087,078 A | | 4/1963 | Brown | |
| 4,174,070 A | * | 11/1979 | Lau et al. | 239/340 |
| 4,433,812 A | * | 2/1984 | Grime | 239/290 |
| 5,307,994 A | * | 5/1994 | Hieronymus | 239/340 |
| 5,655,714 A | * | 8/1997 | Kieffer et al. | 239/318 |
| 5,726,511 A | | 3/1998 | Kusase et al. | |
| 5,803,367 A | * | 9/1998 | Heard et al. | 239/296 |
| 6,316,856 B1 | | 11/2001 | Kusaki et al. | |
| 6,472,786 B1 | | 10/2002 | McCauley et al. | |
| 6,702,203 B2 | * | 3/2004 | Jou | 239/346 |
| 6,796,514 B1 | * | 9/2004 | Schwartz | 239/345 |
| 6,952,062 B1 | | 10/2005 | Mancl et al. | |
| 7,117,961 B2 | * | 10/2006 | Yong et al. | 175/371 |
| 7,481,447 B2 | * | 1/2009 | Stevens | 280/728.2 |
| 2006/0033317 A1 | * | 2/2006 | Stevens | 280/741 |
| 2006/0071097 A1 | * | 4/2006 | Glauser et al. | 239/433 |

* cited by examiner

*Primary Examiner* — Jason J Boeckmann
*Assistant Examiner* — Steven M Cernoch
(74) *Attorney, Agent, or Firm* — Robert J. Harter; www.bobharter.com

(57) ABSTRACT

A paint sprayer includes a motor-driven multi-stage turbine for compressing air, which subsequently flows through a venturi in a paint gun to draw in paint or some other liquid from a canister. To prevent the high-pressure air from expelling lubricant from the motor's inboard bearing, a pressure responsive annular seal axially deflects and sealingly engages an axial face of the bearing. To avoid subjecting the seal and bearing to excess air pressure and temperature created by the turbine, a bypass bleed line diverts some air to atmosphere when the paint gun is closed.

13 Claims, 4 Drawing Sheets

PAINT SPRAYER WITH BEARING PROTECTION

CROSS-REFERENCE TO RELATED APPLICATIONS

This application is a continuation-in-part of co-pending patent application Ser. No. 12/462,093 filed on Jul. 29, 2009, which in turn claims the benefit of provisional patent application Ser. No. 61/207,774 filed Feb. 17, 2009 by the present inventors.

FIELD OF THE INVENTION

The subject disclosure generally pertains to paint sprayers and more specifically to means for protecting a bearing from detrimentally high air pressure.

BACKGROUND

Many paint sprayers comprise an air compressor that supplies pressurized air to a portable paint gun. High-pressure air discharging from the compressor and flowing through the paint gun draws up liquid paint from a canister, and a nozzle on the spray gun then sprays the mixture of paint and air to a target surface. Although such paint sprayers are effective, there seems to be an ongoing need to improve their quality and longevity.

DETAILED DESCRIPTION

Figure 1:
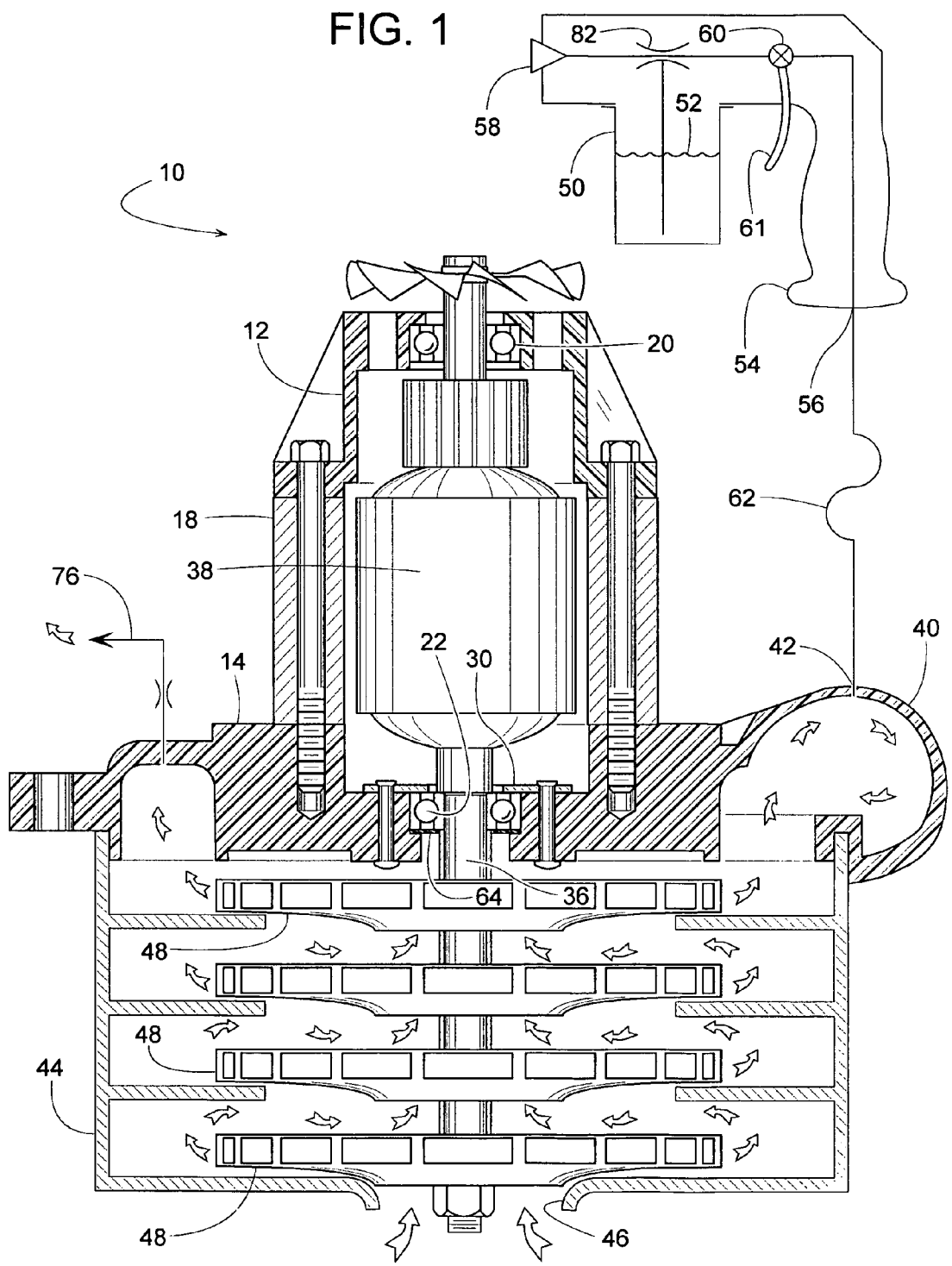
FIG. 1 shows one example of a paint sprayer with its motor shown in cross-section and its paint gun shown schematically.
Figure 2:
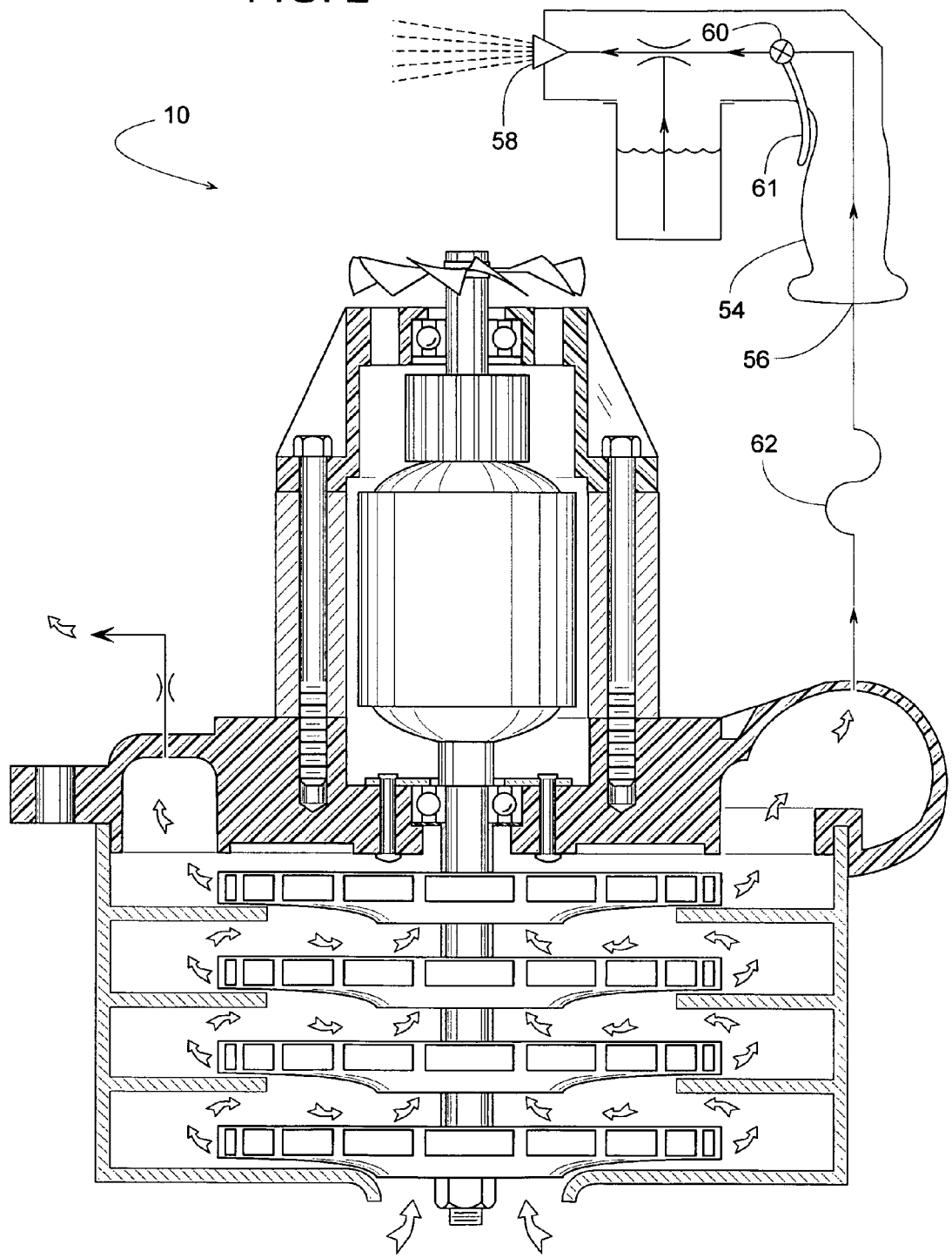
FIG. 2 is similar to FIG. 1 but showing the paint sprayer's valve in an open position rather than the closed position of FIG. 1.

FIGS. 1-3 and FIG. 3a show one example of a paint sprayer 10. In this particular example, paint sprayer 10 comprises an outboard motor bracket 12, an inboard motor bracket 14 with a bearing bore 16; a stator 18 interposed between outboard motor bracket 12 and inboard motor bracket 14; an outboard rolling element bearing 20 supported by outboard motor bracket 12; an inboard rolling element bearing 22 that includes an outer race 24, an inner race 26, and a plurality of rollers 28 interposed between races 24 and 26. The terms, "roller" and "rollers" refer to any shaped element meant for rolling between two bearing races. Examples of such rollers include, but are not limited to, spherical balls, cylinders, cones segments, etc. In some examples, a bearing retainer 30 holds inboard bearing 22 in place. In other examples, inboard bearing 22 is held in place by an adhesive and/or an interference fit between the bearing's outer race and the bore in which the bearing is installed.

Outer race 24 is supported by inboard motor bracket 14. Outer race 24 and inner race 26 provide a first axial face 32 and a second axial face 34 that are substantially concentric, face away from outboard bearing 20, and are radially spaced apart from each other. In some examples, axial faces 4 and/or 4 are the outermost axial surface faces that face away form outboard bearing 20. For the illustrated example, first axial face 32 is on outer race 24, and second axial face 34 is on inner race 26; however, the nomenclature of the terms, "first" and "second" could be reversed, i.e., first axial face 32 could be on inner race 26 and second axial face 34 could be on outer race 24.

For this example, paint sprayer 10 further comprises a shaft 36 extending through bearing bore 16 of inboard motor bracket 14. Shaft 36 is supported by inboard bearing 22 and outboard bearing 20. This example of paint sprayer 10 also comprises a rotor 38 supported by shaft 36; a discharge volute 40 (sometimes known as a discharge horn) adjacent to inboard motor bracket 14 and defining a discharge opening 42; a turbine housing 44 adjacent to discharge volute 40 and defining a suction inlet 46; and a plurality of turbine wheels 48 attached to shaft 36 and disposed within turbine housing 44 such that shaft 36, rotor 38, and the plurality of turbine wheels 48 rotate as a unit at a rotational speed that may vary in response to changing discharge pressure. The present invention is particularly effective with rotor 38 and stator 18 being a universal motor with rotor 38 rotating at speeds in excess of 10,000 revolutions per minute.

This example of paint sprayer 10 also includes a paint canister 50 to hold a liquid 52 (e.g., paint, stain, etc.) and a paint gun 54 connected to paint canister 50. Paint gun 54 has an air inlet 56, a spray outlet 58, and a paint gun valve 60. A finger trigger 61 moves paint gun valve 60 between an open position (FIG. 2) and a closed position (FIG. 1) to respectively open or obstruct flow from air inlet 56 to spray outlet 58. To convey pressurized air to paint gun 54, a hose 62 connects discharge opening 42 of discharge volute 40 to air inlet 56 of paint gun 54.

To prevent high pressure, high temperature air from flushing the lubricant out from within inboard bearing 22, paint sprayer 10 includes an annular seal 64. Seal 64 encircles shaft 36 and axially engages first axial face 32 and second axial face 34 of inboard bearing 28 with an upstream surface 66 of seal 64 facing away from inboard bearing 22. Seal 64 is held against first axial face 32 (on race 26 as illustrated, or on race 24) and seal 64 is pneumatically urged against second axial face 34 with an axial pneumatic pressure 68 against upstream surface 66. The axial pneumatic pressure 68 increases with the rotational speed of the plurality of turbine wheels 48, wherein the rotational speed of the plurality of turbine wheels 48 increases in response to paint gun valve 60 moving from the open position to the closed position.

In some examples of paint sprayer 10, seal 64 has a deflection coefficient of 0.0005 to 0.02. Such a deflection coefficient allows seal 64 to flexibly press in axial sealing contact against second axial face 34 of inboard bearing 22 yet provides seal 64 with sufficient stiffness to avoid excessive distortion of the seal. The deflection coefficient is a ratio defined as a numerator divided by a denominator, wherein the numerator is the axial pneumatic pressure 68 (against upstream surface 66) multiplied by a difference between the seal's outer diameter 70 and inner diameter 72. The denominator of the deflection coefficient is an axial material thickness 74 of seal 64 multiplied by a Young's modulus of elasticity (i.e., specifically the tensile modulus of elasticity at 73° F.) of the seal's material.

The axial pneumatic pressure 68, outer diameter 70, inner diameter 72, the axial material thickness 74, and the Young's modulus of elasticity can be in any units that render the deflection coefficient a dimensionless ratio. For example, the axial pneumatic pressure can be units of psig (pounds per square-inch), diameters 70 and 72 can be in units of inches, the Young's modulus of elasticity can be in units of psi (pounds per square-inch), and the axial material thickness 74 can be in units of inches.

The axial pneumatic pressure is in terms of gage pressure rather than absolute pressure, the seal's axial material thickness 74 is taken at a radial midpoint between races 24 and 26, and the Young's modulus of elasticity is with respect to tension rather than flexural. The Young's modulus of elasticity is with respect to the material being tested at 73° Fahrenheit, wherein the 73° F. is for testing purpose only, and that the actual temperature of seal 64 during operation can be dramatically higher than that.

In some examples, outer diameter 70 of seal 64 is about 1.0 inch, inner diameter 72 is about 0.5 inches, thickness 74 is about 0.032 inches, and seal 64 is comprised mostly or entirely of polytetrafluoroethylene. With a Young's modulus of elasticity of about 70,000 psi, this example provides a deflection coefficient of about 0.002 when pressure 68 is at 10 psig. In some examples, seal 64 is comprised of polytetrafluoroethylene impregnated with an additive such as molybdenum or graphite for lubricity. Other examples of seal 64 are made of other materials and/or different dimensions.

In some examples, the rotation of impellers 48 provides a discharge pressure 68 (axial pneumatic pressure against the seal's upstream surface 66) of about 10 psig. In other examples, the discharge pressure ranges from 5 to 15 psig.

Some examples of paint sprayer 10 includes a bypass bleed line 76 connecting discharge opening 42 of discharge volute 40 in restricted fluid communication with atmosphere to place upstream surface 66 of seal 64 in restricted fluid communication with atmosphere, thereby limiting pneumatic pressure buildup within discharge volute 40, limiting the axial pneumatic pressure 68 against upstream surface 66 of seal 64, and providing at least some airflow through discharge volute 40 when valve 60 is in the closed position. The point at which bypass bleed line 76 connects to paint sprayer 4 can be anywhere downstream of at least one impeller 48 and upstream of valve 60. The expression, "restricted fluid communication" means that for a given pressure differential, the airflow through line 76 is less than the airflow through hose 62 when valve 60 is fully open. There are many ways of providing bleed line 76 with restricted airflow. Examples of such ways include, but are not limited to, line 76 having a smaller inner diameter than hose 62 or an orifice, capillary or some type of valve in series-flow relationship with line 76. In some examples, bypass bleed line 76 includes a pressure relief valve that open in response to pressure 68 within discharge volute 40 reaching some predetermined limit.

To establish a predetermined axial position of the impeller nearest discharge volute 40, some examples of paint sprayer 10 include a sleeve 78 on shaft 36. Once installed, sleeve 78 is considered as being part of shaft 36, i.e., shaft 36 includes sleeve 78. Sleeve 78 axially engages inner race 26 of inboard bearing 22 and axially engages an axial surface of the nearest impeller 48. In some examples, sleeve 78 radially engages an inner periphery 80 of seal 64. In other examples, radial clearance 79 exists between sleeve 78 and the seal's inner periphery 80.

Figure 3:
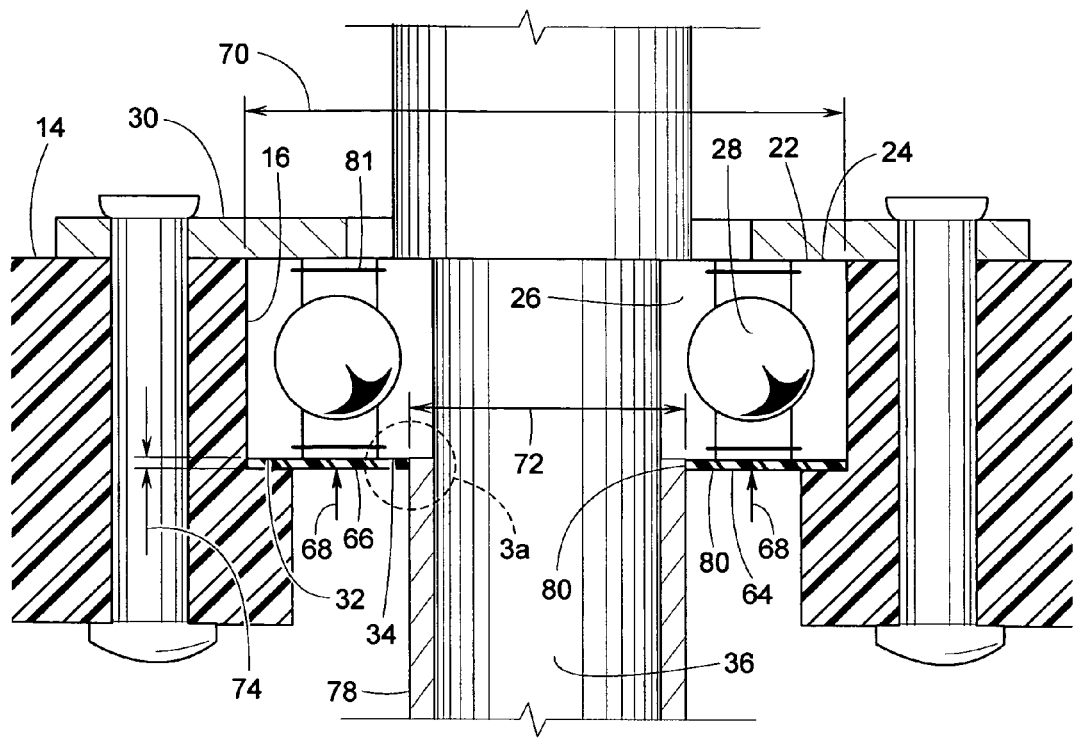
FIG. 3 is a cross-sectional view showing the paint sprayer's annular seal and FIG. 3a is an enlarged detail of circled section 3a of FIG. 3.
Figure 3A:
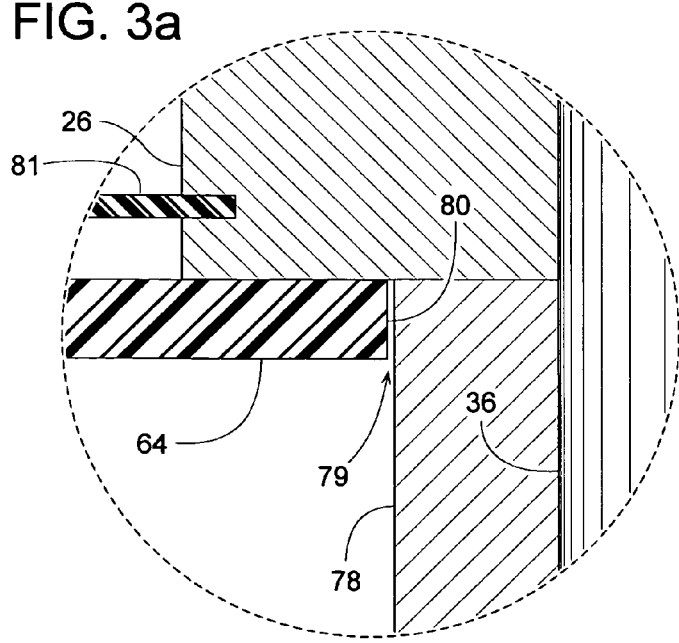

It should be noted that the expression, "paint sprayer" and "paint gun" refer to any devices for spraying any liquid including, but not limited to, paint. The illustrated example of paint sprayer 10 has four impellers for four sequential stages of compression; however, paint sprayer 10 can have any number of impellers, more or less than four. Although bypass bleed line 76 limits pressure 68 in discharge volute 40, the pressure is not limited to any particular value and may continue to increase with increasing rotational speed of impellers 48. Outer race 24 of inboard bearing 22 can be a single piece as shown in the example, or outer race 24 can include additional pieces including, but not limited to, annular shims, rings, collars, spacers, sleeves, bushings, etc., wherein such additional pieces are fixed relative to outer race 24. Inner race 26 of inboard bearing 22 can be a single piece as shown in the example, or inner race 26 can include additional pieces including, but not limited to, annular shims, rings, collars, spacers, sleeves, bushings, etc., wherein such additional pieces are fixed relative to inner race 26. In some examples, as shown in FIG. 3, inboard bearing 22 includes its own integral seals or shields 81 that are considered generally non-removable from bearing 22.

It should also be noted that various multiple component parts of paint sprayer 10 could be combined into single parts and vice versa. For the example shown in FIGS. 1-3, for instance, inboard motor bracket 14 and discharge volute 40 are a one-piece integral extension of each other. Canister 50 can be attached directly to paint gun 54 as shown, but in other examples of paint sprayer 10, canister 50 is a separate piece with a long hose connecting the relatively remote canister 50 to paint gun 54. In either case, a venturi 82 can be used to enable pressurized air flowing through paint gun 54 to draw in liquid 52 up from within canister 50.

Additional information related to paint sprayer 10 is found in U.S. Pat. No. 6,952,062, which is specifically incorporated by reference herein.

Figure 4:
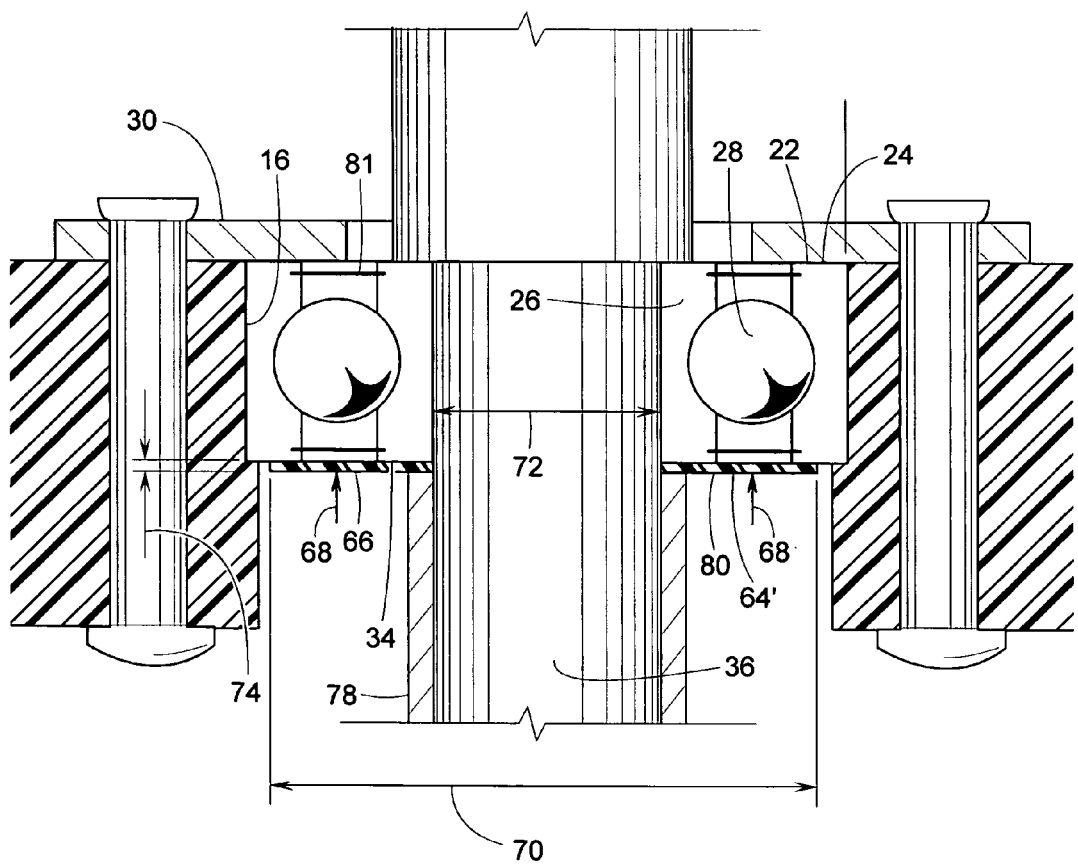
FIG. 4 is a cross-sectional view similar to FIG. 3 but showing another example seal arrangement.

In some examples of paint sprayer 10, surprising and unexpected improvement in bearing protection and bearing life was achieved when seal 64 or 64' was comprised mostly or entirely of metal instead of plastic with some radial clearance (e.g., 0.010 inches) at the metal seal's inner periphery (FIG. 3a) or at the metal seal's outer periphery (seal 64' of FIG. 4). Although seal 64 can be made of various metals and alloys, seal 64 being made of steel or brass works particularly well. In some examples, seal 64 is comprised of steel with outer diameter 70 of seal 64 being about 1.0 inch, inner diameter 72 being about 0.5 inches, and thickness 74 being about 0.020 inches. In some examples, the outer diameter of the seal is a few thousandths of an inch less than the adjacent bearing's outer diameter, and/or the inner diameter of the seal is a few thousandths of an inch greater than the shaft's outer diameter (or a few thousandths of an inch less than the outer diameter of a shaft's sleeve or spacer).

Although certain example methods, apparatus, and articles of manufacture have been described herein, the scope of the coverage of this patent is not limited thereto. On the contrary, this patent covers all methods, apparatus, and articles of manufacture fairly falling within the scope of the appended claims either literally or under the doctrine of equivalents.

The invention claimed is:

1. A paint sprayer for spraying a liquid to atmosphere, the paint sprayer comprising:
    an outboard motor bracket;
    an inboard motor bracket defining a bearing bore;
    a stator interposed between the outboard motor bracket and the inboard motor bracket;
    an outboard bearing supported by the outboard motor bracket;
    an inboard bearing comprising an outer race, an inner race, and a plurality of rollers interposed between the inner race and the outer race, the outer race being supported by the inboard motor bracket, the outer race and the inner race provide a first axial face and a second axial face that are substantially concentric, face away from the outboard bearing, and are radially spaced apart from each other;

a shaft extending through the bearing bore of the inboard motor bracket, the shaft being supported by the inboard bearing and the outboard bearing;

a rotor supported by the shaft in proximity with the stator;

a discharge volute adjacent to the inboard motor bracket and defining a discharge opening;

a turbine housing being adjacent to the discharge volute and defining a suction inlet;

a turbine wheel attached to the shaft and disposed within the turbine housing such that the shaft, the rotor, and the turbine wheel rotate as a unit at a rotational speed that varies;

a paint canister to hold the liquid therein;

a paint gun connected in fluid communication with the paint canister, the paint gun defining an air inlet and a spray outlet;

a hose connecting the discharge opening of the discharge volute to the air inlet of the paint gun;

a paint gun valve borne by the paint gun, the paint gun valve being movable between an open position and a closed position to selective open and obstruct flow from the air inlet to the spray outlet, the rotational speed of the turbine wheel increases in response to the paint gun valve moving from the open position to the closed position; and an annular seal disposed around the shaft and axially engaging the first axial face and the second axial face of the inboard bearing with the annular seal being held against the first axial face and the annular seal being pneumatically urged against the second axial face with an axial pneumatic pressure that increases with the rotational speed of the turbine wheel, the annular seal includes an upstream surface that faces toward the turbine wheel, the annular seal includes an inner periphery that defines a radial clearance adjacent thereto.

2. The paint sprayer of claim 1, wherein the annular seal is comprised mostly of polytetrafluoroethylene.

3. The paint sprayer of claim 1, wherein the second axial face is on the inner race of the inboard bearing.

4. The paint sprayer of claim 1, further comprising a sleeve disposed on the shaft and axially engaging the inner race of the inboard bearing.

5. The paint sprayer of claim 4, wherein the radial clearance is between the sleeve and the inner periphery of the annular seal.

6. The paint sprayer of claim 1, wherein the annular seal has a deflection coefficient of less than 0.02 with the deflection coefficient being defined as a numerator divided by a denominator, the numerator is the axial pneumatic pressure multiplied by a difference between an outer diameter of the annular seal and an inner diameter of the annular seal, the denominator is an axial material thickness of the annular seal multiplied by a Young's modulus of elasticity of a material of which the annular seal is comprised, wherein the axial pneumatic pressure, the outer diameter, the inner diameter, the axial material thickness and the Young's modulus of elasticity are in units that render the deflection coefficient a dimensionless ratio, the axial pneumatic pressure is in terms of gage pressure rather than absolute pressure, the Young's modulus of elasticity is with respect to tension rather than flexural, and the Young's modulus of elasticity is with respect to the material being at 73° Fahrenheit.

7. The paint sprayer of claim 6, wherein the deflection coefficient is greater than 0.0005.

8. The paint sprayer of claim 1, wherein the annular seal is comprised of metal.

9. A paint sprayer for spraying a liquid to atmosphere, the paint sprayer comprising:

an outboard motor bracket;

an inboard motor bracket defining a bearing bore;

a stator interposed between the outboard motor bracket and the inboard motor bracket;

an outboard bearing supported by the outboard motor bracket;

an inboard bearing comprising an outer race, an inner race, and a plurality of rollers interposed between the inner race and the outer race, the outer race being supported by the inboard motor bracket, the outer race and the inner race provide a first axial face and a second axial face that are substantially concentric, face away from the outboard bearing, and are radially spaced apart from each other;

a shaft extending through the bearing bore of the inboard motor bracket, the shaft being supported by the inboard bearing and the outboard bearing;

a rotor supported by the shaft in proximity with the stator;

a discharge volute adjacent to the inboard motor bracket and defining a discharge opening;

a turbine housing being adjacent to the discharge volute and defining a suction inlet;

a plurality of turbine wheels attached to the shaft and disposed within the turbine housing such that the shaft, the rotor, and the plurality of turbine wheels rotate as a unit at a rotational speed that varies;

a paint canister to hold the liquid therein;

a paint gun attached to the paint canister, the paint gun defining an air inlet and a spray outlet;

a hose connecting the discharge opening of the discharge volute to the air inlet of the paint gun;

a paint gun valve borne by the paint gun, the paint gun valve being movable between an open position and a closed position to selective open and obstruct flow from the air inlet to the spray outlet, the rotational speed of the plurality of turbine wheels increases in response to the paint gun valve moving from the open position to the closed position; and an annular seal disposed around the shaft and axially engaging the first axial face and the second axial face of the inboard bearing with the annular seal being held against the first axial face and the annular seal being pneumatically urged against the second axial face with an axial pneumatic pressure that increases with the rotational speed of the plurality of turbine wheels, the annular seal includes an upstream surface that faces toward the plurality of turbine wheels, the annular seal has a deflection coefficient of less than 0.02 with the deflection coefficient being defined as a numerator divided by a denominator, the numerator is the axial pneumatic pressure multiplied by a difference between an outer diameter of the annular seal and an inner diameter of the annular seal, the denominator is an axial material thickness of the annular seal multiplied by a Young's modulus of elasticity of a material of which the annular seal is comprised, wherein the axial pneumatic pressure, the outer diameter, the inner diameter, the axial material thickness and the Young's modulus of elasticity are in units that render the deflection coefficient a dimensionless ratio, the axial pneumatic pressure is in terms of gage pressure rather than absolute pressure, the Young's modulus of elasticity is with respect to tension rather than flexural, and the Young's modulus of elasticity is with respect to the material being at 73° Fahrenheit.

10. The paint sprayer of claim 9, wherein the deflection coefficient is greater than 0.0005.

11. The paint sprayer of claim 9, wherein the annular seal is comprised of metal.

12. A paint sprayer for spraying a liquid to atmosphere, the paint sprayer comprising:
- an outboard motor bracket;
- an inboard motor bracket defining a bearing bore;
- a stator interposed between the outboard motor bracket and the inboard motor bracket;
- an outboard bearing supported by the outboard motor bracket;
- an inboard bearing comprising an outer race, an inner race, and a plurality of rollers interposed between the inner race and the outer race, the outer race being supported by the inboard motor bracket, the outer race and the inner race provide a first axial face and a second axial face that are substantially concentric, face away from the outboard bearing, and are radially spaced apart from each other, the second axial face is on the inner race of the inboard bearing;
- a shaft extending through the bearing bore of the inboard motor bracket, the shaft being supported by the inboard bearing and the outboard bearing;
- a rotor supported by the shaft in proximity with the stator;
- a discharge volute adjacent to the inboard motor bracket and defining a discharge opening;
- a turbine housing being adjacent to the discharge volute and defining a suction inlet;
- a plurality of turbine wheels attached to the shaft and disposed within the turbine housing such that the shaft, the rotor, and the plurality of turbine wheels rotate as a unit at a rotational speed that varies;
- a paint canister to hold the liquid therein;
- a paint gun attached to the paint canister, the paint gun defining an air inlet and a spray outlet;
- a hose connecting the discharge opening of the discharge volute to the air inlet of the paint gun;
- a paint gun valve borne by the paint gun, the paint gun valve being movable between an open position and a closed position to selective open and obstruct flow from the air inlet to the spray outlet, the rotational speed of the plurality of turbine wheels increases in response to the paint gun valve moving from the open position to the closed position;
- an annular seal disposed around the shaft and axially engaging the first axial face and the second axial face of the inboard bearing with the annular seal being held against the first axial face and the annular seal being pneumatically urged against the second axial face with an axial pneumatic pressure that increases with the rotational speed of the plurality of turbine wheels, the annular seal includes an upstream surface that faces toward the plurality of turbine wheels, the annular seal has a deflection coefficient of less than 0.02 with the deflection coefficient being defined as a numerator divided by a denominator, the numerator is the axial pneumatic pressure multiplied by a difference between an outer diameter of the annular seal and an inner diameter of the annular seal, the denominator is an axial material thickness of the annular seal multiplied by a Young's modulus of elasticity of a material of which the annular seal is comprised, wherein the axial pneumatic pressure, the outer diameter, the inner diameter, the axial material thickness and the Young's modulus of elasticity are in units that render the deflection coefficient a dimensionless ratio, the axial pneumatic pressure is in terms of gage pressure rather than absolute pressure, the Young's modulus of elasticity is with respect to tension rather than flexural, and the Young's modulus of elasticity is with respect to the material being at 73° Fahrenheit, the annular seal is comprised mostly of polytetrafluoroethylene;
- a bypass bleed line connecting the discharge opening of the discharge volute in restricted fluid communication with atmosphere to place the upstream surface of the annular seal in restricted fluid communication with atmosphere, thereby limiting pneumatic pressure buildup within the discharge volute, limiting the axial pneumatic pressure against the upstream surface of the annular seal, and providing at least some airflow through the discharge volute when the paint gun valve is in the closed position; and
- a sleeve disposed on the shaft and axially engaging the inner race of the inboard bearing and radially engaging an inner periphery of the annual seal.

13. The paint sprayer of claim 12, wherein the annular seal is comprised of metal.

* * * * *